: 3,203,951
Patented Aug. 31, 1965

3,203,951
NEW LONG LASTING SULFA DRUGS
Paul Diedrich, Berlin-Spandau, Germany, assignor to Schering AG, Berlin, Germany
No Drawing. Filed June 30, 1960, Ser. No. 39,770
Claims priority, application Germany, July 8, 1959, Sch 26,329
3 Claims. (Cl. 260—239.75)

This invention relates to drugs having a protracted effect and composed of benzene sulfonamide derivatives and more particularly to sulfanylamido pyrimidines and their salts or derivatives wherein the 5-position of the pyrimidine ring is substituted by an alkoxy radical.

In accordance with the invention, long-lasting efficacious benzene sulfonamides are produced by conversion of reactive acid derivatives of benzene sulfonic, sulfenic, or sulfinic acids, containing amino groups or groups convertible into amino groups in the p-position, to 2-(p-aminobenzene-sulfonamido)-5-alkoxy pyrimidine compounds. Such substituted benzene sulfonamides may be produced by reacting the said derivatives of benzene sulfonic, sulfenic, or sulfinic acids with 2-halogen or 2-amino-5-alkoxy pyrimidine or a suitable derivative and if necessary by subsequent oxidation to the sulfonic acid and liberation of the amino group in the benzene ring to form benzene sulfonamide pyrimidines which are distinguished from the known sulfanilamido pyrimidines by substitution of an alkoxy group in the 5-position of the pyrimidine ring, e.g., as follows:

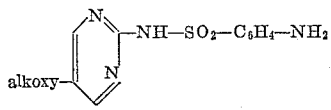

In general, there are in the alkoxy group, preferably, not more than 4 carbon atoms in the alkoxy group and even more preferably the alkoxy group is either methoxy or ethoxy.

In accordance with the method of producing the 5-alkoxy substituted pyrimidine ring compounds or their salts, the substituted benzene sulfonic, sulfenic or sulfinic acids in the form of their halogen or anhydride derivatives are reacted with 2-amino-5-alkoxy pyrimidines to form the corresponding 2-amino benzene sulfonic, sulfenic or sulfinic-5-alkoxy pyrimidine derivative. The 5-alkoxy pyrimidine derivative may also be prepared by reacting the substituted benzene sulfon, sulfin, or sulfen amides with 2-halogen-5-alkoxy pyrimidines. The 5-alkoxy pyrimidine derivative may further be prepared by converting the benzene sulfonamides in the form of their salts, where the amide is present as an anion, by reacting the same with 2-trimethyl ammonium-5-alkoxy pyrimidine. Still another method consists in converting the benzene sulfonic acid derivatives in the form of their sulfonyl guanidines by reaction of the same with beta-dicarbonyl compounds containing a CO—CHXCO enolizable group, and where X is an alkoxy group. These beta-dicarbonyl compounds are for example, alkoxylized derivatives of malonic dialdehyde and methoxymalonic acid diethylester. After conversion in these cases, the hydroxy groups in the 4 and/or 6 position, if present, are replaced with hydrogen. Where the basic compound used is a sulfenic or sulfinic acid derivative, the sulfonic group is produced by oxidation and where the group substituted in the nucleus is a group convertible to an amino group, the amino group is liberated.

The 2-sulfanylamido-5-alkoxy pyrimidines produced in this manner function the same as the known group of highly efficacious sulfonamides of the pyrimidine series, but of most importance the new drugs of this invention have been demonstrated in the treatment of human beings to be longer lasting at the same strengths. The same excellent properties with respect to the range of application as well as the level of activity of these 5-alkoxy substituted sulfanylamidopyrimidines was observed in a number of comparative tests with both sulfadiazine (-(2-p-aminobenzenesulfonamido)-pyrimidine), the active constitutent of many well known medicinal products, and sulfanilamido-ethyl-thiodiazol which likewise has proved to be of therapeutic utility. The tests were carried out as in-vitro experiments employing the plate thinning test with busamagar (2% meat hydrolyzate "Busam," 1% dextrose, 0.5% horse blood). The sulfamide concentrations in the plates were in parts 1:10,000: 1:30,000: 1:100,000: 1:300,000: and 1:1,000,000. After applying the germs as ten vaccination strips onto each thinning plate, it was observed that distinct to complete inhibition of the growth of bacteria was obtained at 1:30,000 and 1:100,000 parts concentration. In the case of some particular bacteria (e.g., *Br. abortus* Bang, *E. coli, Str. pyogenes*) the bacteria growth was inhibited even at a concentration of 1:300,000.

The toxicity observed to be in the same order of magnitude as toxicities of sulfonamides with correspondingly high activity, is compared as follows.

TABLE I

| Compound: | Minimum lethal dose in gr./kg. rat i.v. LD/50 |
|---|---|
| 2-sulfanilamido-5-methoxy-pyrimidine | 1.1 |
| 2-sulfanilamido-pyrimidine (sulfadiazine) | 0.9 |
| 3-sulfanilamido-6-methoxy-pyridiazine | 1.1 |
| 3-sulfanilamido-2-phenyl-pyrazole | 0.7 |

In blood tests with human beings, it was observed that by using the 5-alkoxy substituted pyrimidines of this invention, every case resulted in producing a suprisingly long-lasting high level of concentration of the sulfa drug in the blood. For example, when perorally administering 1 gram of the sodium salt of 2-sulfanilamido-5-methoxy-pyrimidine to a human, the concentration of the methoxy pyrimidine in the blood after 4 to 8 hours was found to average between 4 and 5 mg. per 100 cc. of blood. Where intravenous application of the alkoxy substituted pyrimidine is employed, the blood has been found to contain more than 4 mg. per 100 cc. after one hour, and even after 24 hours, the blood was found to still contain above 3 mg. per 100 cc. in all cases tested, and in some humans tested the concentration of the alkoxy substituted pyrimidine drug was as much as 4 mg. per 100 cc. of blood.

By contrast, in comparative blood tests made using sulfadiazine, the most closely chemically related sulfonamide, it was found that to obtain equally high concentrations of the sulfa drug in the blood (e.g., over 4 mg./100 cc.) there is required a peroral administration of 3 doses of 1 gram each, or in other words, three times as much as the 5-alkoxy substituted pyrimidine of the present invention. Furthermore, tests showed that even after the peroral administration of 3 grams of sulfadiazine, the concentration of the sulfa drug in the blood decreased so rapidly, that at the end of 20 hours there is found only 2 mg. per 100 cc. of blood.

Correspondingly, it has also been found that these 5-alkoxy substituted pyrimidines, for example 2-sulfanilamido-5-methoxy pyrimidine, are excreted relatively slowly in the urine. An average of less than 30% of the input of the alkoxy substituted pyrimidine was released to the urine after 24 hours, both where the sulfa pyrimidine drug was administered orally and in the case of intravenous injection of 1 gram of the drug. Furthermore, only a small percentage of the sulfa drug was acetylized.

A great deal of interest has been shown recently concerning these sulfonamides, and in particular, attempts have been made to decrease the frequency of administration of these sulfa drugs because a high frequency is currently required to maintain an effective concentration in the blood. As a matter of fact, various substitutions of sulfanilamido pyrimidines have been described, such as set out in The Journal of American Chemical Society, 1947, vol. 69, II, pages 3072–3078. In this connection, however, it was found, as shown by the prior art and confirmed by recent tests, that the introduction of an alkoxy group in the 4 or 6 position of the pyrimidine ring was accompanied by such a marked decrease in the bacteriostatic effect of the sulfa pyrimidine compound that it made the same medically useless for all practical purposes.

It was, therefore, absolutely and completely unexpected that the introduction of an alkoxy group in the 5-position of the pyrimidine ring of the sulfa pyrimidine drug compounds would produce such a marked improvement in the therapeutic properties of these drugs. Instead of there being a diminution of the bacteriostatic activity of these drugs, as could be expected, there is obtained an opposite result—their therapeutic activity in human beings is protracted.

The following examples are presented to illustrate methods of preparing the compounds, but said examples are not to be considered limitative of the specification and appended claims.

EXAMPLE 1

*Preparation of 2-(p-aminobenzenesulfonamido)-5-methoxy pyrimidine (melting point 211–212° C.)*

To prepare this compound, 12.6 grams of 2-amino-5-methoxy pyrimidine, 26.4 grams of carbethoxy-sulfanilic acid chloride and 50 cc. of dry pyridine are heated for 30 minutes with frequent shaking to a temperature of 80° C. The reaction product is then mixed with 200 cc. of water and with dilute hydrochloric acid (0.1 N) until the reaction is acid to Congo Red indicator. A precipitate is formed which is then filtered under suction, washed with distilled water, and dried at 150° C. A practically quantitative yield is recovered of 2-(p-carbethoxy-amino-benzene-sulfonamido)-5-methoxy-pyrimidine, M.P. 248–250° C.

To hydrolize the sulfa pyrimidine compound, the same is heated at 90° C. with 200 cc. of 2 N potassium hydroxide solution for about one hour until complete solution is obtained. The resultant solution is then cooled to room temperature (25° C.) and acidified with acetic acid to precipitate the hydrolized product, which is then recrystallized from dilute acetone admixed with animal charcoal.

(In the foregoing example, the 2-amino-5-methoxy pyrimidine compound is obtained having a melting point of about 300° C. by condensation of methoxy-malonic-acid ester with guanidine carbonate in the presence of sodium ethylate. The resultant reaction product is then converted to 2-amino-5-methoxy-4,6 dichlorpyrimidine (melting point 216–217° C.) by heating said reaction product with phosphorus oxychloride. The dichloro compound is then suspended in water with zinc dust and is tested in the presence of caustic alkaline or carbonates to produce the 2-amino-5-methoxy pyrimidine compound, M.P. 80—82° C., benzene.)

EXAMPLE 2

In this instance the method was carried out as in Example 1, by reacting 13.9 grams of 2-amino-5-ethoxy pyrimidine having a melting point of 113–115° C. (intermediate products: ethoxy-malonyl-guanidine, M.P. above 300° C., 5-ethoxy-2-amino-4,6-dichloropyrimidine, M.P. 188–189° C.) with 26.4 grams of carbethoxy-sulfanilic acid chloride and 50 cc. dry pyridine to produce the corresponding 2-(p-carbethoxy-amino-benzene-sulfonamido)-5-ethoxy pyrimidine compound having a melting point of 240–241° C.

Hydrolysis of this latter compound in the same manner as described in Example 1 yields the 2-(p-aminobenzenesulfonamido)-5-ethoxy-pyrimidine which may be purified by recrystallization from acetone in the presence of animal charcoal. Colorless crystals of the product are obtained having a melting point of 204–206° C.

Where other 5-alkoxy substituted pyrimidine sulfanyl amino compounds are desired, the same can be produced by employing the appropriate reactants and carrying out the process as described.

It is further apparent to one skilled in the art that it is possible, without departing from the spirit and scope thereof, to devise embodiments of this invention other than those set forth in the above examples, and accordingly it is to be understood that the invention is not limited to the particular embodiments therein described. For example, once a skilled chemist is aware of the benefits derived from substituting one group such as the alkoxy group at the 5-position in the pyrimidine ring, he would no doubt consider the possibility of substituting other groups at the same position. Therefore, the substitution of other operable groups at the 5-position is within the spirit and scope of the present invention.

What is claimed is:

1. A compound of the formula

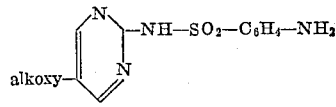

wherein the alkoxy group is of from 1–2 carbon atoms.

2. The compound of claim 1, wherein the alkoxy group is a methoxy group.

3. The compound of claim 1, wherein the alkoxy group is an ethoxy group.

References Cited by the Examiner

UNITED STATES PATENTS

| | | | |
|---|---|---|---|
| 2,403,713 | 7/46 | English | 260—239.75 |
| 2,407,966 | 9/46 | Sprague | 260—239.7 |
| 2,430,439 | 11/47 | Winnek et al. | 260—239.75 |
| 2,494,524 | 1/50 | Sprague | 260—239.75 |
| 2,566,038 | 8/51 | Sieger | 260—239.75 |
| 2,687,415 | 8/54 | Goldberg | 260—256.4 |
| 2,688,019 | 8/54 | Hitchings et al. | 260—256.4 |
| 2,773,061 | 12/56 | Loop | 260—239.75 |
| 2,792,391 | 5/57 | Mueller et al. | 260—239.75 |
| 2,891,949 | 6/59 | Webb et al. | 260—239.75 |
| 2,986,573 | 5/61 | Topliss et al. | 167—65 |
| 3,004,889 | 10/61 | Kuna et al. | 167—65 |

FOREIGN PATENTS

| | | |
|---|---|---|
| 555,865 | 9/43 | Great Britain. |
| 575,005 | 1/46 | Great Britain. |

OTHER REFERENCES

Adams et al.: Journal American Chemical Society, vol. 67, pages 735–738 (pages 736–37 relied on) (1945).

Braker et al.: Journal American Chemical Society, vol. 69, pages 3072–3078 (1947).

Budesinsky et al.: Ceskoslov. farm., vol. 10, pages 14 to 20 (1961).

Horstmann et al.: Arzneimittel-Forschung, vol. 11, pages 682–684 (August 1961).

Van Kyke et al.: J. Pharm. Exp. Therap., vol. 83, pages 203–212 (1945).

WALTER A. MODANCE, *Primary Examiner.*

HERBERT J. LIDOFF, IRVING MARCUS, *Examiners.*